(12) United States Patent  
Sundrani

(10) Patent No.: US 9,292,205 B2  
(45) Date of Patent: Mar. 22, 2016

(54) METHODS AND SYSTEMS FOR ADAPTIVE QUEUE DEPTH MANAGEMENT

(75) Inventor: Kapil Sundrani, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 635 days.

(21) Appl. No.: 13/517,732

(22) Filed: Jun. 14, 2012

(65) Prior Publication Data

US 2013/0339599 A1   Dec. 19, 2013

(51) Int. Cl.  
*G06F 13/00* (2006.01)  
*G06F 3/06* (2006.01)

(52) U.S. Cl.  
CPC .............. *G06F 3/061* (2013.01); *G06F 3/0653* (2013.01); *G06F 3/0659* (2013.01); *G06F 3/0689* (2013.01)

(58) Field of Classification Search  
CPC combination set(s) only.  
See application file for complete search history.

(56) References Cited

U.S. PATENT DOCUMENTS

| | | | |
|---|---|---|---|
| 7,739,470 B1 * | 6/2010 | Norgren | 711/168 |
| 8,868,797 B1 * | 10/2014 | Kirac et al. | 710/15 |
| 2004/0044846 A1 | 3/2004 | Matthews et al. | |
| 2004/0193397 A1 * | 9/2004 | Lumb et al. | 703/24 |
| 2004/0194095 A1 * | 9/2004 | Lumb et al. | 718/100 |
| 2007/0083703 A1 * | 4/2007 | Kolli et al. | 711/112 |
| 2010/0191876 A1 | 7/2010 | Muppirala et al. | |

* cited by examiner

*Primary Examiner* — Charles Rones  
*Assistant Examiner* — Han Doan

(57) ABSTRACT

The invention may be embodied in a multiple-disk data storage system including a controller module that initiates an optimization algorithm to set maximum queue depth of each disk of the data storage system to desired queue depth of each disk. Desired queue depth of each disk may be associated with performance factors including, but not limited to, input/output operations per second (IOPs), average response time, and/or maximum response time of each disk. Desired queue depth of each disk may be further associated with priority rankings of performance factors.

18 Claims, 6 Drawing Sheets

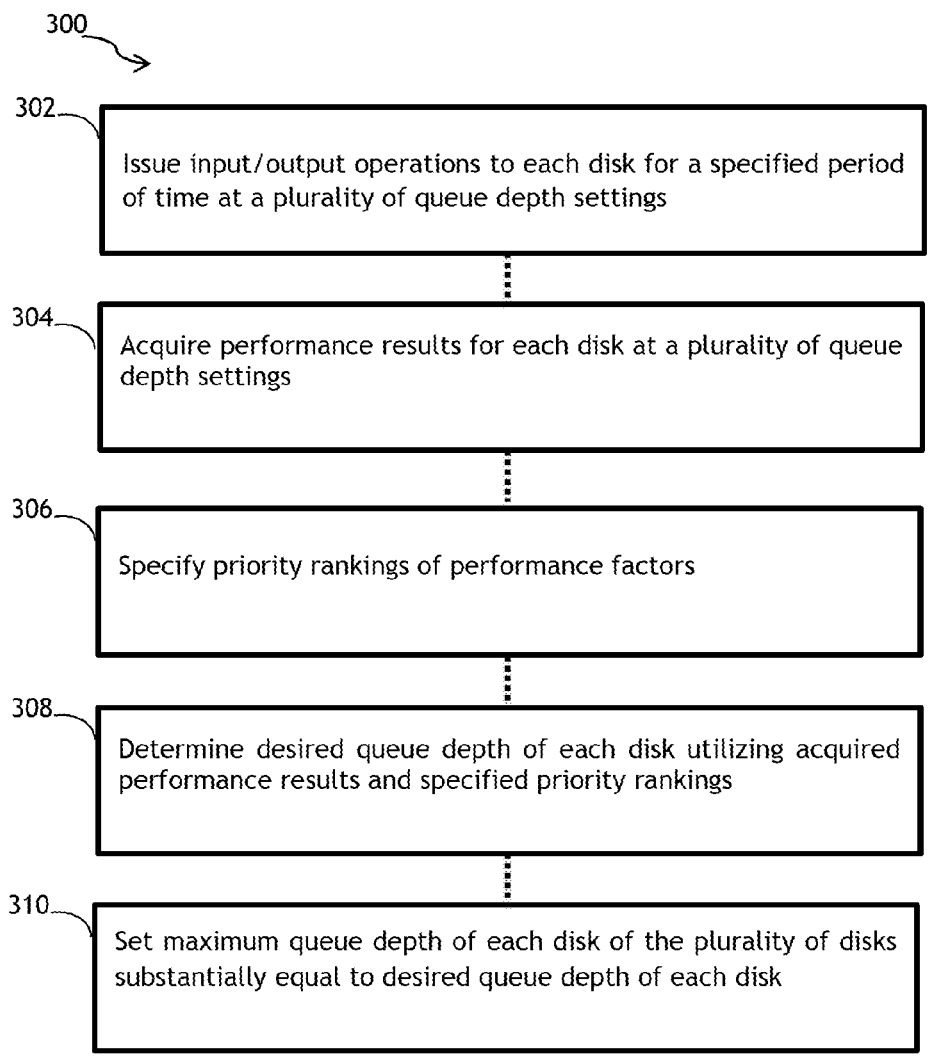

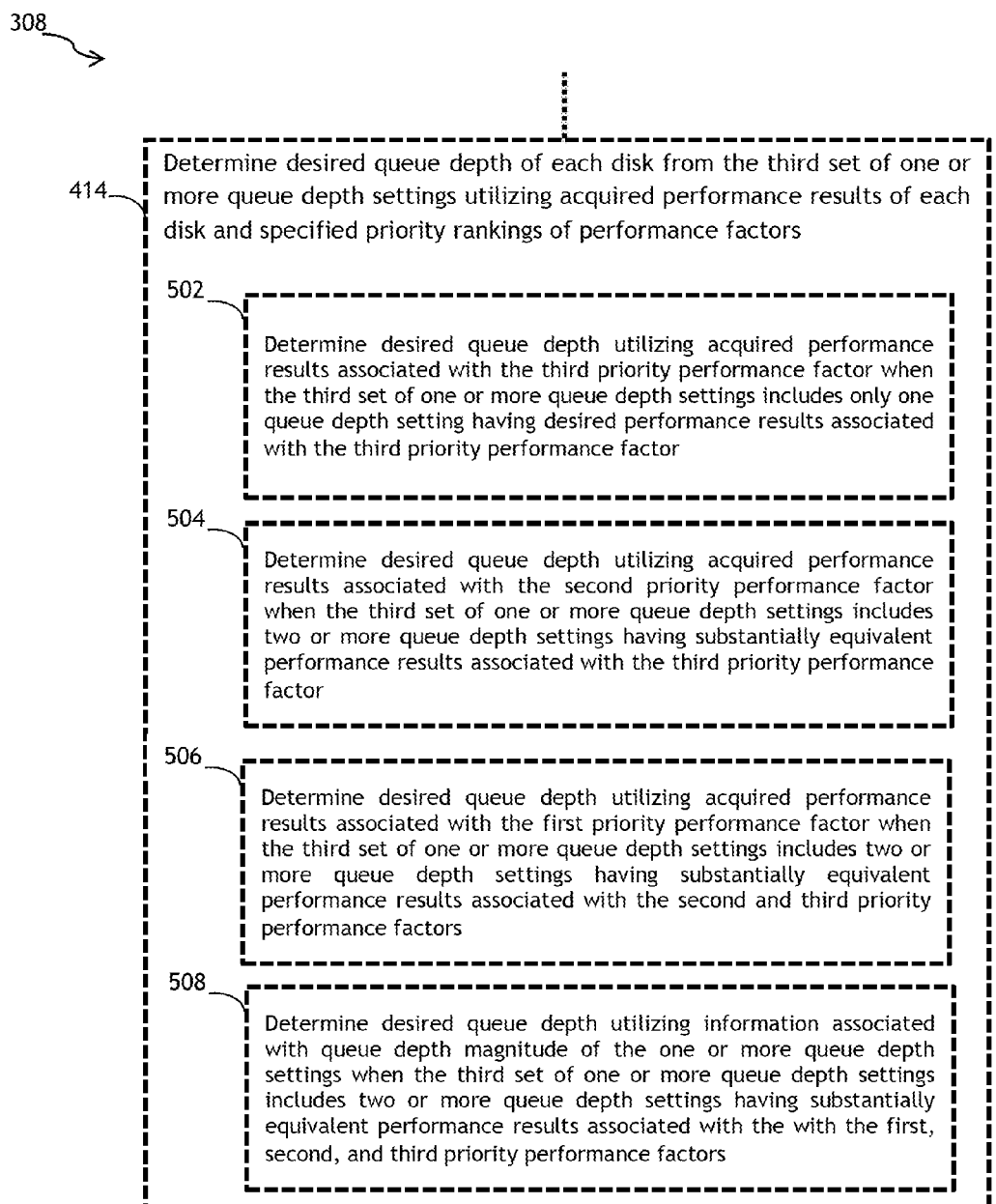

METHODS AND SYSTEMS FOR ADAPTIVE QUEUE DEPTH MANAGEMENT

TECHNICAL FIELD

The present invention relates to the field of data storage systems, and in particular to system and method for optimizing maximum queue depths of a plurality of disks in a data storage system.

BACKGROUND

Data storage systems, such as RAID storage systems and other multiple-disk storage systems, often rely on a plurality of data storage disks operating in conjunction to manage high volumes of data efficiently. Technological developments in the field of data storage devices have led to several different types of data storage technologies (e.g. SSD, SAS, SATA, flash, etc.) that can be employed for different disks in the same data storage system. As a result, performance characteristics may not be uniform among a plurality of disks making up a data storage system.

Overall performance of a data storage system is driven by the performance of each individual disk of the plurality of disks making up the data storage system. The performance of a data storage system can be defined as the number of input/output operations (IOs) that the plurality of disks making up the system can handle in a given period of time. A queue depth for each disk is a parameter associated with the number of outstanding IOs issued to a disk and still awaiting response. If IOs are issued in excess of a disk's maximum queue depth, the disk may eventually return a "queue full" response signaling an initiator issuing the IOs to stop or reduce the number of IOs being sent to the disk. A "queue full" condition from any disk in the plurality of disks making up a data storage system tends to decrease the overall performance of data storage system.

It is desirable to set maximum queue depth of each disk high enough to avoid "queue full" conditions. However, increasing maximum queue depth also tends to increase response time per IO of the disk. Accordingly, maximum queue depth settings of individual disks in a data storage system can decrease overall performance of the data storage system if maximum queue depths of the disks are set too high or too low. Furthermore, the relationship between performance parameters (e.g. IOs per second, average response time, maximum response time, etc.) and various queue depth settings often varies among the disks making up the data storage system because of different disk technologies being employed, among other reasons.

SUMMARY

The present invention is directed to system and method for optimizing maximum queue depths of a plurality of disks in a multiple-disk data storage system.

In one aspect, the present invention includes a system for optimizing maximum queue depths of a plurality of disks in a data storage system, including a plurality of disks and a controller module in communication with each disk of the plurality of disks, the controller module configured to: initiate an optimization algorithm at a specified time to set maximum queue depth of each disk of the plurality of disks; issue input/output operations to each disk of the plurality of disks for a specified period of time at a plurality of queue depth settings; acquire performance results at a plurality of queue depth settings, wherein the performance results are associated with at least one of input/output operations per second (IOPs), average response time, and maximum response time of each disk of the plurality of disks; determine desired queue depth of each disk of the plurality of disks utilizing acquired performance results; and set maximum queue depth of each disk of the plurality of disks substantially equal to desired queue depth of each disk of the plurality of disks.

In another aspect, the present invention further includes a method of optimizing maximum queue depths of a plurality of disks in a multiple-disk storage system, including: initiating an optimization algorithm at a specified time to set maximum queue depth of each disk of a plurality of disks; issuing input/output operations to each disk of the plurality of disks for a specified period of time at a plurality of queue depth settings; acquiring performance results at a plurality of queue depth settings, wherein the performance results are associated with at least one of input/output operations per second (IOPs), average response time, and maximum response time of each disk of the plurality of disks; determining desired queue depth of each disk of the plurality of disks utilizing acquired performance results; and setting maximum queue depth of each disk of the plurality of disks substantially equal to desired queue depth of each disk of the plurality of disks.

In another aspect, the present invention further includes a method of optimizing maximum queue depths of a plurality of disks in a multiple-disk storage system, including: initiating an optimization algorithm at a specified time to set maximum queue depth of each disk of a plurality of disks; issuing input/output operations to each disk of the plurality of disks for a specified period of time at a plurality of queue depth settings; acquiring performance results at a plurality of queue depth settings, wherein the performance results are associated with at least one of input/output operations per second (IOPs), average response time, and maximum response time of each disk of the plurality of disks; specifying priority rankings of performance factors associated with at least one of IOPs, average response time, and maximum response time of each disk of the plurality of disks; determine desired queue depth of each disk of the plurality of disks utilizing acquired performance results and specified priority rankings of performance factors; and setting maximum queue depth of each disk of the plurality of disks substantially equal to desired queue depth of each disk of the plurality of disks.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 3A is a flow diagram illustrating a method for optimizing maximum queue depths of a plurality of disks in a data storage system utilizing specified priority rankings for one or more performance factors, in accordance with one embodiment of the present invention.

FIG. 3D is a flow diagram illustrating a portion of a method for optimizing maximum queue depths of a plurality of disks in a data storage system, wherein desired queue depth of a disk is determined utilizing one or more performance factors having specified priority rankings, in accordance with one embodiment of the present invention.

DETAILED DESCRIPTION

Reference will now be made in detail to the subject matter disclosed, which is illustrated in the accompanying drawings.

FIGS. 1 through 3D generally illustrate a system and method for optimizing maximum queue depths of a plurality of disks in a data storage system. Data storage systems, such as RAID storage systems or any other multiple-disk storage system, often employ a plurality of disks which may not have uniform performance characteristics. Each disk of the plurality of disks may affect overall performance of the data storage system due to limitations associated with the ability of each disk to handle input/output operations (IOs). Each disk may have maximum queue depth associated with a limit on number of IOs awaiting response from the disk at any given time. Exceeding maximum queue depth associated with a disk of the plurality of disks may decrease overall performance of the data storage system. However, increasing maximum queue depth of the disk may limit disk performance due to increased response time of the disk. Limited disk performance due to increased response time may also decrease overall performance of the data storage system. Accordingly, the present invention is directed to a system and method of setting maximum queue depth of each disk of a plurality of disks making up the data storage system to desired queue depth utilizing information associated with performance characteristics of each disk.

As used throughout the present disclosure the term "disk" encompasses any storage device or storage medium. The term "disk" may include, but is not limited to, a solid-state disk (SSD), hard disk drive (HDD), serial attached SCSI (SAS) HDD, serial advanced technology attachment (SATA) HDD, flash memory, magnetic disk, optical disk, and the like. The foregoing examples of possible disk technologies are illustrative only. It is contemplated that the present invention may be extended to any storage device or storage medium making up a multiple-disk or multiple-device data storage system that is now or hereafter known to the art. Accordingly, foregoing examples should not be interpreted to limit the present invention in any way.

Figure 1:
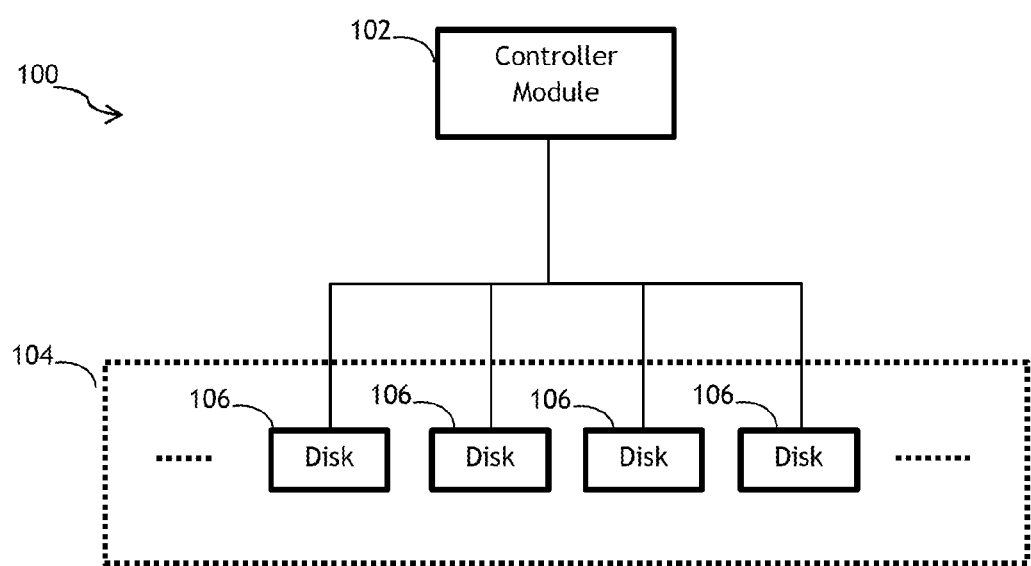
FIG. 1 is a block diagram illustrating a system for optimizing maximum queue depths of a plurality of disks in a data storage system, in accordance with one embodiment of the present invention.

FIG. 1 illustrates a system 100 for optimizing maximum queue depths of a plurality of disks 104 in a data storage system. The system 100 may be configured to set maximum queue depth of each disk 106 of a plurality of disks 104 in a data storage system to desired queue depth of each disk 106. Desired queue depth of each disk may include, but is not limited to, a specified or calculated queue depth value of each disk 106 for desired overall system performance. For example, desired queue depth may include optimal queue depth of each disk 106 associated with one or more performance factors, such as one or more queue depth settings associated with highest input/output operations per second (IOPs), lowest average response time, and/or lowest maximum response time.

The system 100 may include a plurality of disks 104 configured to receive IOs from one or more initiators implemented utilizing hardware, software, and/or firmware. The one or more initiators may include, but are not limited to, controller modules, host controllers, master controllers, administrators, other disks, and the like. The plurality of disks 104 may be further configured to be a redundant array of independent disks (RAID) or any other configuration of two or more disks 106 accessible by a computing system as a single drive or other form of combined memory storage.

The system 100 may further include a controller module 102 in communication with each disk 106 of the plurality of disks 104. For example, the controller module 102 may be communicatively coupled to each disk 106 of the plurality of disks 104. The controller module may be configured to issue one or more IOs to each disk 106 of the plurality of disks 104. The controller module may be further configured to receive one or more responses from each disk 106 in association with the one or more IOs issued to the each disk 106.

The controller module 102 may be implemented utilizing hardware, software, and/or firmware running on or included in one or more computing systems. For example, the controller module 102 may include one or more processors communicatively coupled to carrier media having program instructions. The one or more processors may be configured to execute program instructions from the carrier media to initiate an optimization algorithm (discussed below) to set queue depth of each disk 106 of the plurality of disks 104 to desired queue depth of each disk 106.

In one embodiment, the controller module 102 may be configured to initiate the optimization algorithm for the plurality of disks 104 at a specified time. The specified time may be a predetermined time or an event. For example, the controller module 102 may be configured to initiate the optimization algorithm at a set time and date, a recurring time every day, a recurring time and day of the week or any other predetermined time. Alternatively, the controller module 102 may be configured to initiate the optimization algorithm on the occurrence of an event such as start-up, restart, user selection, disk failure, disk swap or any other event. All those skilled in the art should understand the foregoing examples of predetermined times and/or events are included by way of example only and are not intended to limit the present invention in any way.

The controller module 102 may be configured execute the optimization algorithm from program instructions on carrier media utilizing one or more computing systems. Accordingly, the controller module 102 may be configured to issue IOs to each disk 106 of the plurality of disks 104 at a plurality of queue depth settings for a specified period of time. The plurality of queue depth settings may include any maximum queue depth settings for each disk 106 in the power of 2 (e.g. 1, 2, 4, 8, 16, . . . ). For example, the plurality of queue depth settings may include, but is not limited to, maximum queue depth settings in the range of 1 to 256 for each disk 106. The specified period of time for issuing IOs to each disk 106 may include any predefined, calculated, or user-selected period of time.

The controller module 102 may be further configured to acquire performance results associated with one or more performance factors, such as input/output operations per second (IOPs), average response time, and/or maximum response time of each disk 106 at each queue depth setting of the plurality of queue depth settings. The controller module 102 may be further configured to determine desired queue depth of each disk 106 of the plurality of disks 104 utilizing acquired performance results associated with the one or more performance factors. The controller module 102 may be further configured to set maximum queue depth of each disk 106 of the plurality of disks 104 to a desired queue depth associated with each disk 106. Accordingly, each disk 106 of the plurality of disks 104 may be configured to have an individually set maximum queue depth associated with performance characteristics of each individual disk 106. Tuning each disk 106 to an individually set maximum queue depth reflecting the desired queue depth of each disk 106 may offer advantages for overall performance of the data storage system employing the plurality of disks 104.

In one embodiment, the controller module 102 may be further configured to optimize maximum queue depth settings for one or more disks of the plurality of disks 104 without affecting other disks of the plurality of disks 104. The controller module 102 may be configured to optimize maximum queue depth settings for the one or more disks at a time subsequent to the specified time at which the plurality of disks 104 is initially optimized. For example, the controller module 106 may be configured to optimize maximum queue depth settings of a newly added disk, a disk having been reset, a disk having been switched from an "off" to an "on" state, or any disk specified for queue depth optimization without running the optimization algorithm for other disks of the plurality of disks 104. Accordingly, all foregoing and following discussions associated with "each disk 106" of the plurality of disks 104 shall extend to one or more disks of the plurality of disks 104 individually specified for queue depth optimization or meeting a predefined criteria, such as having been newly added, reset, activated, or any other desired criteria.

In one embodiment, the controller module 102 may be further configured to specify priority rankings for the one or more performance factors. The specified priority rankings may be user-selected or otherwise predetermined. For example, the controller module may be configured to specify priority rankings for IOPs, average response time, and/or maximum response time of each disk 106 of the plurality of disks 104. The controller module 102 may be further configured to make a comparison between acquired performance results and the specified priority rankings of the one or more performance factors. For example, the controller module 102 may be configured to determine one or more sets of acquired performance results having values in accordance with the specified priority rankings. The controller module 102 may be further configured to determine one or more queue depth settings corresponding to the one or more sets of acquired performance results having values in accordance with the specified priority rankings. The controller module 102 may be further configured to determine desired queue depth for each disk 106 of the plurality of disks 104 from the one or more queue depth settings utilizing information associated with acquired performance results and specified priority rankings of the one or more performance factors. The controller module 102 may be further configured to set maximum queue depth of each disk 106 equal to or substantially equal to desired queue depth.

In one embodiment, for example, the controller module may be configured to specify a first priority performance factor, a second priority performance factor, and a third priority performance factor for each disk 106 of the plurality of disks 104. For illustrative purposes only, the first priority performance factor may be associated with the highest priority ranking and all succeeding priority performance factors may designate successively lower priority rankings. The first, second, and third priority performance factors may each be associated with IOPs, average response time, or maximum response time of each disk 106. It is further contemplated that any number of performance factors could be assigned any number of priority rankings. Accordingly, the three-factor example discussed herein is illustrative of one embodiment and should not be understood to limit the present invention in any way.

The controller module 102 may be configured to make a comparison between acquired performance results of each disk 106 and the first priority performance factor to determine a first set of three or more queue depth settings for each disk 106 having desired values for the first priority performance factor. The first set of three or more queue depth settings may include queue depth setting values from the plurality of queue depth settings tested by the controller module 102. The first set of three or more queue depth settings may correspond to acquired performance results associated with the first priority performance factor. For example, the first set may include three queue depth settings corresponding to acquired performance results meeting criteria established by the first priority performance factor, such as highest number of IOPs, lowest average response time, or lowest maximum response time.

The controller module 102 may be further configured to make a comparison between acquired performance results of each disk 106 and the second priority performance factor to determine a second set of two or more queue depth settings for each disk 106 having desired values for the second priority performance factor. The second set of two or more queue depth settings may include queue depth setting values from the first set of three or more queue depth settings determined by the controller module 102. The second set of two or more queue depth settings may correspond to acquired performance results associated with the second priority performance factor. For example, the second set may include two queue depth settings chosen from the first set of three or more queue depth settings, with the second set corresponding to acquired performance results meeting criteria established by the second priority performance factor, such as highest number of IOPs, lowest average response time, or lowest maximum response time.

The controller module 102 may be further configured to make a comparison between acquired performance results of each disk 106 and the third priority performance factor to determine a third set of one or more queue depth settings for each disk 106 having desired values for the third priority performance factor. The third set of one or more queue depth settings may include queue depth setting values from the second set of two or more queue depth settings determined by the controller module 102. The third set of one or more queue depth settings may correspond to acquired performance results associated with the third priority performance factor. For example, the third set may include one queue depth setting chosen from the second set of two or more queue depth settings, with the third set corresponding to acquired performance results meeting criteria established by the third priority performance factor, such as highest number of IOPs, lowest average response time, or lowest maximum response time. The third set of one or more queue depth settings of each disk 106 corresponding to acquired performance results associated with the third priority performance factor may include desired queue depth of each disk 106. The controller module 102 may be configured to determine desired queue depth utilizing a queue depth setting having desired performance results associated with the third priority performance factor when the third set includes one queue depth setting having desired performance results associated with the third priority performance factor.

In some instances, the third set of one or more queue depth settings of a disk 106 of the plurality of disks 104 may include two or more queue depth settings having substantially equivalent performance results associated with the third priority performance factor. In one embodiment, the controller module 102 may be configured to determine desired queue depth of the disk 106 from the third set of one or more queue depth settings utilizing performance results associated with the second or first priority performance factors when the third set includes two or more queue depth settings having substantially equivalent performance results associated with the third priority performance factor. For example, the controller module 102 may be configured to determine desired queue depth utilizing a queue depth setting having desired performance results associated with the second priority performance factor when the third set includes two or more queue depth settings having substantially equivalent performance results associated with the third priority performance factor.

In a further embodiment, the controller module 102 may be configured to determine desired queue depth of the disk 106 from the third set of one or more queue depth settings utilizing performance results associated with the first priority performance factor when the third set includes two or more queue depth settings having substantially equivalent performance results associated with the third priority performance factor and substantially equivalent performance results associated with the second priority performance factor. For example, the controller module 102 may be configured to determine desired queue depth utilizing a queue depth setting having desired performance results associated with the first priority performance factor when the third set includes two or more queue depth settings having substantially equivalent performance results associated with the second and third priority performance factors.

In a further embodiment, the controller module 102 may be configured to determine desired queue depth of the disk 106 from the third set of one or more queue depth settings utilizing information associated with queue depth magnitude of queue depth settings when the third set includes two or more queue depth settings having substantially equivalent performance results associated with all of the performance factors. For example, in a three-factor priority scheme, the controller module 102 may be configured to determine desired queue depth utilizing a highest queue depth setting when two or more queue depth settings have substantially equivalent performance results associated with desired values for the first, second, and third priority performance factors.

In one embodiment, the controller module 102 may be further configured to round acquired performance results associated with the one or more performance factors to specified numerical bounds. For example, the controller module 102 may be configured to round acquired performance results reflecting IOPs of each disk 106 to the nearest hundredth. Similarly, the controller module 102 may be configured to round acquired performance results reflecting average response time and/or maximum response time of each disk 106 to the nearest millisecond. The foregoing examples are illustrative only and are not intended to limit the present invention in any way. It is further contemplated that the controller module 102 may be configured to round acquired performance results to any variety of numerical bounds specified by a user or predefined by the controller module.

Figure 2:
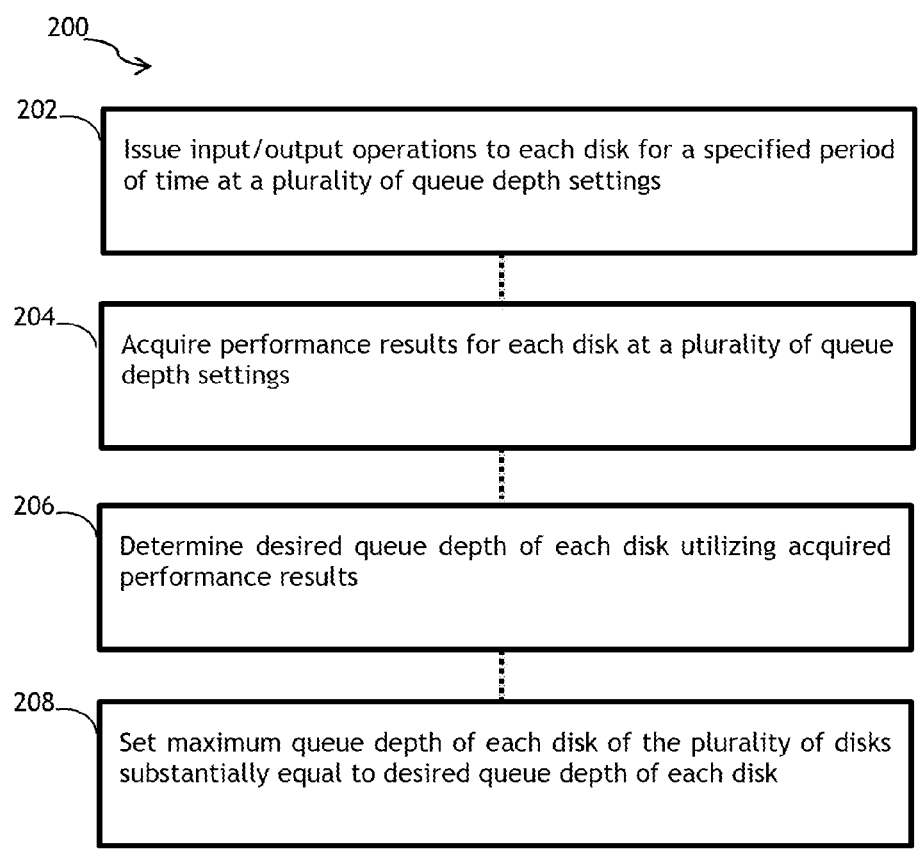
FIG. 2 is a flow diagram illustrating a method for optimizing maximum queue depths of a plurality of disks in a data storage system, in accordance with one embodiment of the present invention.

In accordance with the foregoing discussion of system 100, FIGS. 2 through 3D are flow diagrams illustrating method 200 and method 300 of optimizing maximum queue depths of a plurality of disks 104 in a data storage system. The foregoing descriptions and examples with respect to system 100 extend to method 200 and method 300, unless otherwise noted herein. However, it is contemplated that various elements of method 200 and method 300 may be implemented with other devices and/or systems known to the art without departing from the essence of this present disclosure. Accordingly, system 100 is only one exemplary means for implementing elements of method 200 and method 300 and is not intended to limit the present invention in any way. In addition descriptions and examples presented herein with respect to method 200 extend to method 300 and those relating to method 300 extend to method 200, unless otherwise noted herein.

Referring to FIG. 2, the method 200 may include a step 202 of issuing IOs to each disk 106 of the plurality of disks 104 for a specified period of time at a plurality of queue depth settings. The plurality of queue depth settings may include queue depth settings for each disk 106 in the power of 2 (e.g. 1, 2, 4, 8, 16, ... ). The specified period of time for issuing IOs to each disk 106 may include any predefined, calculated, or user-selected period of time. In one embodiment step 202 may be initiated at a specified time, such as a predetermined time or an event. For example, the specified time may include a set time and date, a recurring time every day, a recurring time and day of the week or any other predetermined time. Alternatively, the specified time may include an event such as start-up, restart, user selection, disk failure, disk swap, disk addition, or any other event. The foregoing examples of predetermined times and/or events are included by way of example only and are not intended to limit the present invention in any way.

The method 200 may further include a step 204 of acquiring performance results associated with one or more performance factors, such as IOPs, average response time, and/or maximum response time, of each disk 106 at a plurality of queue depth settings. The method 200 may further include a step 206 of determining desired queue depth of each disk 106 of the plurality of disks 104 utilizing acquired performance results associated with one or more performance factors. For example, desired queue depth may include queue depth settings corresponding to acquired performance results associated with highest IOPs, lowest average response time, and/or lowest maximum response time. The method 200 may further include a step 208 of setting maximum queue depth of each disk 106 of the plurality of disks 104 substantially equal to desired queue depth of each disk 106. In one embodiment, method 200 may be further extended to optimize maximum queue depth settings of one or more disks of a plurality of disks 104 individually specified for queue depth optimization or meeting predefined criteria, such as having been newly added, reset, activated, or any other desired criteria.

FIGS. 3A through 3D illustrate method 300 including improvements over method 200. As previously described for step 202 with reference to method 200, the method 300 may include a step 302 of issuing IOs to each disk 106 of the plurality of disks 104 for a specified period of time at a plurality of queue depth settings. As previously described for step 204 with reference to method 200, the method 300 may further include a step 304 of acquiring performance results associated with one or more performance factors, such as IOPs, average response time, and/or maximum response time, of each disk 106 at a plurality of queue depth settings.

Figure 3B:
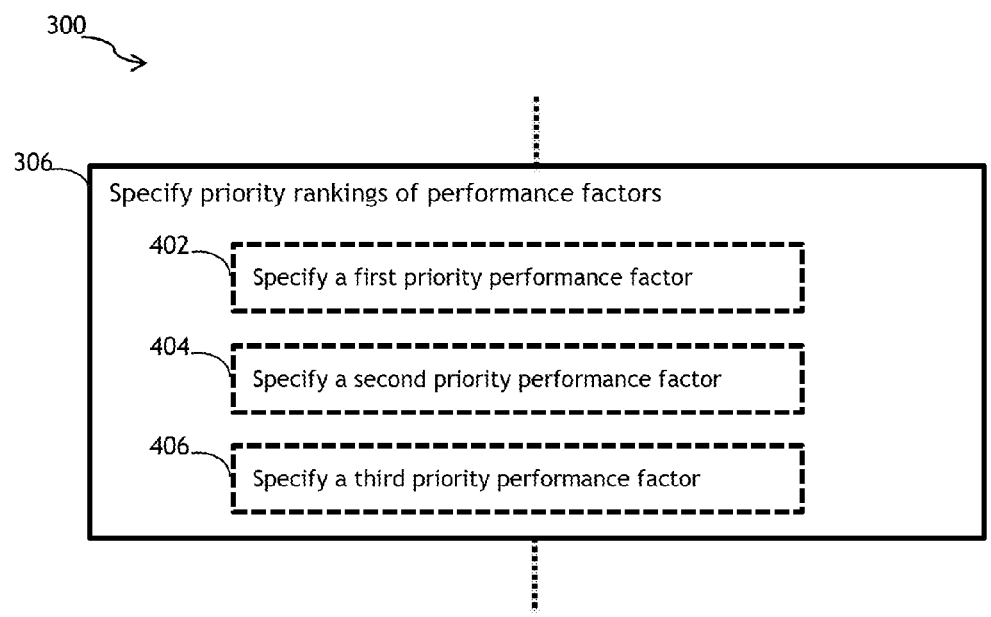
FIG. 3B is a flow diagram illustrating a portion of a method for optimizing maximum queue depths of a plurality of disks in a data storage system, wherein desired queue depth of a disk is determined utilizing one or more performance factors having specified priority rankings, in accordance with one embodiment of the present invention.
Figure 3C:
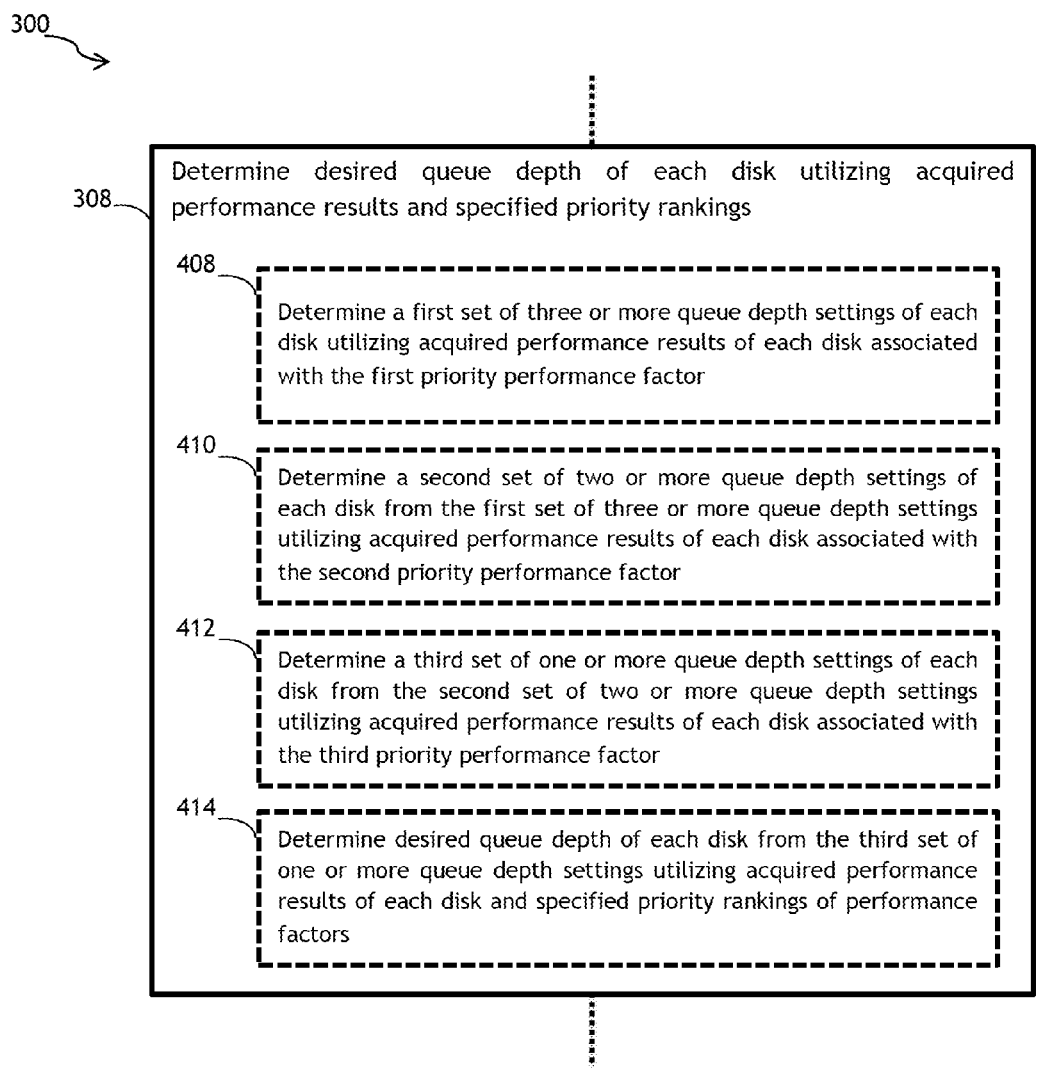
FIG. 3C is a flow diagram illustrating a portion of a method for optimizing maximum queue depths of a plurality of disks in a data storage system, wherein desired queue depth of a disk is determined utilizing one or more performance factors having specified priority rankings, in accordance with one embodiment of the present invention.

The method 300 may further include a step 306 of specifying priority rankings for the one or more performance factors, such as specified priority rankings for IOPs, average response time, and/or maximum response time of each disk 106 of the plurality of disks 104. FIGS. 3B through 3D illustrate an exemplary embodiment of method 300 including three-factor priority scheme to optimize maximum queue depths of a plurality of disks 104 in a data storage system. In the exemplary embodiment utilizing a three-factor priority scheme, step 306 of method 300 may include sub-step 402 of specifying a first priority performance factor, sub-step 404 of specifying a second priority performance factor, and sub-step 406 of specifying a third priority performance factor.

The method 300 may further include a step 308 of determining desired queue depth of each disk 106 utilizing acquired performance results associated with the one or more performance factors and specified priority rankings of the one or more performance factors. For example, desired queue depth of each disk 106 may be determined utilizing queue depth settings corresponding to acquired performance results fulfilling specified priority rankings of the one or more performance factors.

In an exemplary embodiment utilizing a three-factor priority scheme illustrated in FIG. 3C, step 308 of method 300 may further include a sub-step 408 of determining a first set of three or more queue depth settings for each disk 106 having desired values for the first priority performance factor utilizing acquired performance results of each disk 106 associated with the first priority performance factor. For example, the first set may include three queue depth settings corresponding to acquired performance results meeting criteria established by the first priority performance factor, such as highest number of IOPs, lowest average response time, or lowest maximum response time. Step 308 may further include a sub-step 410 of determining a second set of two or more queue depth settings for each disk 106 having desired values for the second priority performance factor from the first set of three or more queue depth settings utilizing acquired performance results of each disk 106 associated with the second priority performance factor. Step 308 may further include a sub-step 412 of determining a third set of one or more queue depth settings for each disk 106 having desired values for the third priority performance factor from the second set of two or more queue depth settings utilizing acquired performance results of each disk 106 associated with the third priority performance factor. Step 308 may further include a sub-step 414 of determining desired queue depth of each disk 106 from the third set of one or more queue depth settings utilizing acquired performance results and specified priority rankings of one or more performance factors.

In some embodiments, method 300 may include additional steps of determining succeeding sets of one or more queue depth settings utilizing successive priority rankings of one or more performance factors (e.g. fourth priority, fifth priority, sixth priority, . . . ). Alternatively, the method 300 may be truncated two implement a two-factor priority scheme, wherein desired queue depth would be filtered out through a first set of one or more queue depth settings and a second set of one or more queue depth settings. It is contemplated that the method 300 could be implemented with any number of priority rankings and performance factors. Accordingly, the three-factor description included herein should be interpreted to extend to any number of priority rankings and performance factors.

Sub-step 414 may further include one or more sub-steps to account for situations when acquired performance results associated with different queue settings yield substantially equivalent results for one or more of the prioritized performance factors. In particular, FIG. 3D illustrates steps for determining desired queue depth of each disk 106 from the third set of one or more queue depth settings when acquired performance results of two or more queue depth settings yield substantially equivalent results for one or more of the performance factors.

Sub-step 414 may include a sub-step 502 of determining desired queue depth of a disk 106 from the third set of one or more queue depth settings utilizing acquired performance results associated with the third priority performance factor. For example, desired queue depth may be determined from the third set of one or more queue depth settings utilizing a queue depth setting corresponding to acquired performance results meeting criteria established by the third priority performance factor, such as highest number of IOPs, lowest average response time, or lowest maximum response time.

However, in some instances two or more queue depth settings may have acquired performance results with substantially equivalent values meeting criteria established by the third priority performance factor. Accordingly, sub-step 414 may include a sub-step 504 of determining desired queue depth of a disk 106 from the third set of one or more queue depth settings utilizing acquired performance results associated with the second or first priority performance factors when the third set of one or more queue depth settings includes two or more queue depth settings having substantially equivalent performance results associated with the third priority performance factor.

Sub-step 414 may further include a sub-step 506 of determining desired queue depth of a disk 106 from the third set of one or more queue depth settings utilizing acquired performance results associated with the first priority performance factor when the third set of one or more queue depth settings includes two or more queue depth settings having substantially equivalent performance results associated with the second and third priority performance factors. Alternatively, in sub-step 506 desired queue depth of the disk 106 may be determined from the third set of one or more queue depth settings utilizing acquired performance results associated with the second priority performance factor when the third set of one or more queue depth settings includes two or more queue depth settings having substantially equivalent performance results associated with the first and third priority performance factors.

In addition, there may be instances when two or more queue depth settings have substantially equivalent results that are desired for all of the performance factors. Accordingly, sub-step 414 may further include sub-step 508 of determining desired queue depth of a disk 106 from the third set of one or more queue depth settings utilizing information associated with magnitude of queue depth settings when the third set includes two or more queue depth settings having substantially equivalent performance results associated with all of the performance factors.

The method 300 may further include a step 310 of setting maximum queue depth of each disk 106 of the plurality of disks 104 substantially equal to desired queue depth of each disk 106.

Methods 200 and 300 may be further extended to optimize maximum queue depth settings of one or more disks of a plurality of disks 104 at any given time without affecting any disk of the plurality of disks 104 other than the one or more disks. For example, the one or more disks may be optimized at a time subsequent to the specified time at which each disk 106 of the plurality of disks 104 is initially optimized. The one or more disks may be individually specified for queue depth optimization or may meet predefined criteria, such as having been newly added, reset, activated, or any other criteria. Accordingly, the system 100 and methods 200 and 300 may account for changes to the configuration of the plurality of disks 104 at any given time without having to re-optimize maximum queue depth settings of each disk 106 of the plurality of disks 104.

The foregoing embodiments of method 200 and method 300 are illustrative only, and it is contemplated that various steps could be included, excluded, and/or carried out in an alternative order without departing from the present invention. It is further contemplated that any number of priority rankings may be given to any number of performance factors. While this disclosure may at different times reference "each disk", "one or more disks", "a disk", it is contemplated that all methods and systems described herein may apply to one or more disks of a plurality of disks in a data storage system. Accordingly, illustrative examples and contextual assignments used herein should not be construed to limit the present invention in any way.

It should be recognized that the various steps described throughout the present disclosure may be carried out by a single computing system or, alternatively, a multiple computing system. Moreover, different subsystems of the system may include a computing system suitable for carrying out at least a portion of the steps described above. Therefore, the above description should not be interpreted as a limitation on the present invention but merely an illustration. Further, the one or more computing systems may be configured to perform any other step(s) of any of the method embodiments described herein.

The computing system may include, but is not limited to, a personal computing system, mainframe computing system, workstation, image computer, parallel processor, or any other device known in the art. In general, the term "computing system" may be broadly defined to encompass any device having one or more processors, which execute instructions from a memory medium.

Program instructions implementing methods such as those described herein may be transmitted over or stored on carrier medium. The carrier medium may be a transmission medium such as a wire, cable, or wireless transmission link. The carrier medium may also include a storage medium such as a read-only memory, a random access memory, a magnetic or optical disk, or a magnetic tape.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system for optimizing maximum queue depths of a plurality of disks in a data storage system, comprising:
    a plurality of disks coupled to a controller module and configured to receive input/output operations from the controller module; and
    the controller module in communication with each disk of the plurality of disks, the controller module comprising a processor and configured to receive one or more responses from each disk of plurality of disks in association with the one or more input/output operations issued to the each disk, the controller module further configured to:
        issue input/output operations to each disk of the plurality of disks for a specified period of time at a plurality of queue depth settings;
        acquire performance results at a plurality of queue depth settings, wherein the performance results are associated with performance factors including at least one of input/output operations per second (IOPs), average response time, and maximum response time of each disk of the plurality of disks;
        specify priority rankings of said performance factors of each disk of the plurality of disks;
        determine desired queue depth of each disk of the plurality of disks utilizing acquired performance results and specified priority rankings;
        set maximum queue depth of each disk of the plurality of disks substantially equal to desired queue depth of each disk of the plurality of disks; and
        initiate an optimizing algorithm at a specified time or event to set the maximum queue depth of each disk of the plurality of disks, the specified time or event including at least one of: a set time and date, a recurring time every day, a recurring time and day of the week, start-up, restart, user selection, disk failure, disk swap, or disk addition.

2. The system of claim 1, wherein the acquired performance results are associated with IOPs, average response time, and maximum response time of each disk of the plurality of disks.

3. The system of claim 1, wherein the controller module is further configured to:
    determine the desired queue depth of each disk of the plurality of disks at a time subsequent to the specified period of time.

4. The system of claim 1, wherein the controller module is further configured to:
    specify a first priority performance factor, wherein the first priority performance factor is associated with at least one of IOPs, average response time, and maximum response time of each disk of the plurality of disks;
    specify a second priority performance factor, wherein the second priority performance factor is associated with at least one of IOPs, average response time, and maximum response time of each disk of the plurality of disks;
    specify a third priority performance factor, wherein the third priority performance factor is associated with at least one of IOPs, average response time, and maximum response time of each disk of the plurality of disks;
    determine a first set of three or more queue depth settings of each disk utilizing acquired performance results of each disk associated with the first priority performance factor;
    determine a second set of two or more queue depth settings of each disk from the first set of three or more queue depth settings utilizing acquired performance results of each disk associated with the second priority performance factor;
    determine a third set of one or more queue depth settings of each disk from the second set of two or more queue depth settings utilizing acquired performance results of each disk associated with the third priority performance factor; and
    determine desired queue depth of each disk of the plurality of disks from the third set of one or more queue depth settings utilizing acquired performance results of each disk and specified priority rankings of performance factors.

5. The system of claim 4, wherein the controller module is further configured to:
    determine desired queue depth of a disk of the plurality of disks from the third set of one or more queue depth settings utilizing acquired performance results of the disk associated with the third priority performance factor.

6. The system of claim 5, wherein the controller module is further configured to:
    determine desired queue depth of a disk of the plurality of disks from the third set of one or more queue depth settings utilizing acquired performance results of the disk associated with the second priority performance factor when the third set of one or more queue depth settings includes two or more queue depth settings having substantially equivalent performance results associated with the third priority performance factor.

7. The system of claim 5, wherein the controller module is further configured to:
    determine desired queue depth of a disk of the plurality of disks from the third set of one or more queue depth settings utilizing acquired performance results of the disk associated with the first priority performance factor when the third set of one or more queue depth settings includes two or more queue depth settings having substantially equivalent performance results associated with the third priority performance factor and the third set of one or more queue depth settings further includes two or more queue depth settings having substantially equivalent performance results associated with the second priority performance factor.

8. The system of claim 5, wherein the controller module is further configured to:
determine desired queue depth of a disk of the plurality of disks from the third set of one or more queue depth settings utilizing information associated with queue depth magnitude of the one or more queue depth settings when the third set of one or more queue depth settings includes two or more queue depth settings having substantially equivalent performance results associated with the with the third priority performance factor and the third set of one or more queue depth settings further includes two or more queue depth settings having substantially equivalent performance results associated with the second priority performance factor and the third set of one or more queue depth settings further includes two or more queue depth settings having substantially equivalent performance results associated with the first priority performance factor.

9. A method of optimizing maximum queue depths of a plurality of disks in a multiple-disk storage system, comprising:
issuing input/output operations to each disk of a plurality of disks for a specified period of time at a plurality of queue depth settings, wherein the specified period of time for issuing input/output operations to each disk of the plurality of disks including a predefined, calculated, or user-selected period of time;
receiving one or more responses from each disk of plurality of disks in association with the one or more input/output operations issued to the each disk;
acquiring performance results at a plurality of queue depth settings, wherein the performance results are associated with performance factors including at least one of input/output operations per second (IOPs), average response time, and maximum response time of each disk of the plurality of disks;
specifying priority rankings of performance factors of each disk of the plurality of disks;
determining desired queue depth of each disk of the plurality of disks utilizing acquired performance results and specified priority factors;
setting maximum queue depth of each disk of the plurality of disks substantially equal to desired queue depth of each disk of the plurality of disks, and
initiating an optimizing algorithm at a specified time or event for setting the maximum queue depth of each disk of the plurality of disks, wherein the specified time or event includes at least one of: a set time and date, a recurring time every day, a recurring time and day of the week, start-up, restart, user selection, disk failure, disk swap, or disk addition.

10. The method of claim 9, wherein the acquired performance results are associated with IOPs, average response time, and maximum response time of each disk of the plurality of disks.

11. The method of claim 9, wherein the method further includes:
determining the desired queue depth of each disk of the plurality of disks at a time subsequent to the specified period of time.

12. A method of optimizing maximum queue depths of a plurality of disks in a multiple-disk storage system, comprising:
issuing input/output operations to each disk of a plurality of disks for a specified period of time at a plurality of queue depth settings;
receiving one or more responses from each disk of plurality of disks in association with the one or more input/output operations issued to the each disk;
acquiring performance results at a plurality of queue depth settings, wherein the performance results are associated with at least one of input/output operations per second (IOPs), average response time, and maximum response time of each disk of the plurality of disks;
specifying priority rankings of performance factors associated with at least one of IOPs, average response time, and maximum response time of each disk of the plurality of disks;
determine desired queue depth of each disk of the plurality of disks utilizing acquired performance results and specified priority rankings of performance factors;
setting maximum queue depth of each disk of the plurality of disks substantially equal, to desired queue depth of each disk of the plurality of disks;
initiating an optimizing algorithm at a specified time or event for setting the maximum queue depth of each disk of the plurality of disks, wherein the specified time or event includes at least one of: a set time and date, a recurring time every day, a recurring time and day of the week, start-up, restart, user selection, disk failure, disk swap, or disk addition; and
determining the desired queue depth of each disk of the plurality of disks at a time subsequent to the specified period of time.

13. The method of claim 12, wherein the acquired performance results are associated with IOPs, average response time, and maximum response time of each disk of the plurality of disks.

14. The method of claim 12, wherein the method further includes:
specifying a first priority performance factor, wherein the first priority performance factor is associated with at least one of IOPs, average response time, and maximum response time of each disk of the plurality of disks;
specifying a second priority performance factor, wherein the second priority performance factor is associated with at least one of IOPs, average response time, and maximum response time of each disk of the plurality of disks;
specifying a third priority performance factor, wherein the third priority performance factor is associated with at least one of IOPs, average response time, and maximum response time of each disk of the plurality of disks;
determining a first set of three or more queue depth settings of each disk utilizing acquired performance results of each disk associated with the first priority performance factor;
determining a second set of two or more queue depth settings of each disk from the first set of three or more queue depth settings utilizing acquired performance results of each disk associated with the second priority performance factor;
determining a third set of one or more queue depth settings of each disk from the second set of two or more queue depth settings utilizing acquired performance results of each disk associated with the third priority performance factor; and determining desired queue depth of each disk of the plurality of disks from the third set of one or more queue depth settings utilizing acquired performance results of each disk and specified priority rankings of performance factors.

15. The method of claim 14, wherein the method further includes:
   determining desired queue depth of a disk of the plurality of disks from the third set of one or more queue depth settings utilizing acquired performance results of the disk associated with the third priority performance factor.

16. The method of claim 14, wherein the method further includes:
   determining desired queue depth of a disk of the plurality of disks from the third set of one or more queue depth settings utilizing acquired performance results of the disk associated with the second priority performance factor when the third set of one or more queue depth settings includes two or more queue depth settings having substantially equivalent performance results associated with the third priority performance factor.

17. The method of claim 14, wherein the method further includes:
   determining desired queue depth of a disk of the plurality of disks from the third set of one or more queue depth settings utilizing acquired performance results of the disk associated with the first priority performance factor when the third set of one or more queue depth settings includes two or more queue depth settings having substantially equivalent performance results associated with the third priority performance factor and the third set of one or more queue depth settings further includes two or more queue depth settings having substantially equivalent performance results associated with the second priority performance factor.

18. The method of claim 14, wherein the method further includes:
   determining desired queue depth of a disk of the plurality of disks from the third set of one or more queue depth settings utilizing information associated with queue depth magnitude of the one or more queue depth settings when the third set of one or more queue depth settings includes two or more queue depth settings having substantially equivalent performance results associated with the with the third priority performance factor and the third set of one or more queue depth settings further includes two or more queue depth settings having substantially equivalent performance results associated with the second priority performance factor and the third set of one or more queue depth settings further includes two or more queue depth settings having substantially equivalent performance results associated with the first priority performance factor.

* * * * *